(12) United States Patent
Hoyda

(10) Patent No.: US 11,350,564 B1
(45) Date of Patent: Jun. 7, 2022

(54) VISION SYSTEM INTEGRATION

(71) Applicant: Hydro-Gear Limited Partnership, Sullivan, IL (US)

(72) Inventor: Damon J. Hoyda, McCordsville, IN (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 395 days.

(21) Appl. No.: 16/457,063

(22) Filed: Jun. 28, 2019

Related U.S. Application Data

(60) Provisional application No. 62/691,445, filed on Jun. 28, 2018.

(51) Int. Cl.
*A01D 34/00* (2006.01)
*G05D 1/00* (2006.01)
(Continued)

(52) U.S. Cl.
CPC ........... *A01D 34/008* (2013.01); *A01D 34/64* (2013.01); *A01D 34/82* (2013.01); *A01D 34/828* (2013.01);
(Continued)

(58) Field of Classification Search
CPC .... A01D 34/008; A01D 34/828; A01D 34/64; A01D 34/82; A01D 2101/00;
(Continued)

(56) References Cited

U.S. PATENT DOCUMENTS 6,609,357 B1 * 8/2003 Davis .................. A01D 34/006
56/10.2 A 6,611,738 B2   8/2003 Ruffner
(Continued)

FOREIGN PATENT DOCUMENTS

| EP | 2944174 | 11/2015 |
|---|---|---|
| JP | 2944774 | 9/1999 |
| WO | WO2018220528 | 12/2018 |

OTHER PUBLICATIONS

Chandler, et al., "Autonomous Agent Navigation Based on Textural Analysis," 2002 Florida Conference on Recent Advances in Robotics, 6 pp.
(Continued)

*Primary Examiner* — Muhammad Shafi
(74) *Attorney, Agent, or Firm* — Neal, Gerber & Eisenberg LLP

(57) ABSTRACT

A control system including a drive system and a blade system; a collision sensor; a main board having a main processor and in communication with the collision sensor, the drive system, and the blade system; the collision sensor, upon sensing a collision, capable of transmitting a collision signal to the main processor; the main board capable of transmitting an adjustment command to the drive system or the blade system; a vision sensor; a vision processor in communication with the vision sensor and the main processor, and capable of determining whether the image data represent an obstacle; the vision sensor capable of transmitting image data to the vision processor; when the vision processor determines the image data represent an obstacle, the vision processor capable of transmitting a collision-replicating signal to the main processor, prompting the main board to transmit the adjustment command to the drive system and/or the blade system.

32 Claims, 5 Drawing Sheets

(51) Int. Cl.
*G05D 1/02* (2020.01)
*A01D 34/82* (2006.01)
*A01D 34/64* (2006.01)
*A01D 101/00* (2006.01)

(52) U.S. Cl.
CPC ......... *G05D 1/0055* (2013.01); *G05D 1/0088* (2013.01); *G05D 1/0214* (2013.01); *A01D 2101/00* (2013.01); *G05D 1/0231* (2013.01); *G05D 1/0255* (2013.01); *G05D 1/0257* (2013.01); *G05D 2201/0208* (2013.01)

(58) Field of Classification Search
CPC .. G05D 1/0088; G05D 1/0214; G05D 1/0055; G05D 1/0255; G05D 1/0231; G05D 2201/0208; G05D 1/0257
USPC .......................................................... 701/23
See application file for complete search history.

(56) References Cited

U.S. PATENT DOCUMENTS

| | | | |
|---|---|---|---|
| 6,819,780 B2 | 11/2004 | Benson et al. | |
| 6,832,000 B2 | 12/2004 | Herman et al. | |
| 8,412,419 B1 | 4/2013 | Seamon et al. | |
| 8,666,550 B2 | 3/2014 | Anderson et al. | |
| 8,731,295 B2 | 5/2014 | Schepelmann et al. | |
| 8,958,939 B2 | 2/2015 | Einecke et al. | |
| 9,137,943 B2 * | 9/2015 | Einecke | G06V 20/10 |
| 9,188,980 B2 | 11/2015 | Anderson | |
| 9,349,187 B2 | 5/2016 | Schepelmann et al. | |
| 9,420,741 B2 | 8/2016 | Balutis et al. | |
| 9,603,300 B2 | 3/2017 | Pettersson | |
| 9,983,586 B2 | 5/2018 | Borinato | |
| 10,157,334 B2 | 12/2018 | Schepelmann et al. | |
| 2014/0215984 A1 | 8/2014 | Bischoff | |
| 2015/0163993 A1 | 6/2015 | Pettersson | |
| 2017/0303466 A1 | 10/2017 | Grufman et al. | |
| 2019/0357430 A1 * | 11/2019 | Kraft | A01D 34/008 |

OTHER PUBLICATIONS

Chandler, et al., "Texture Analysis: A Technique for Autonomous Lawnmower Navigation," 2001 Florida Conference on Recent Advances in Robotics, 7 pp.

Chen, "Going Deeper with Convolutional Neural Network for Intelligent Transportation," Worcester Polytechnic Institute, Electronic Theses and Dissertations, Jan. 28, 2016, 70 pp.

Franzius, et al., "Embedded Robust Visual Obstacle Detection on Autonomous Lawn Mowers," Honda R&D Europe, Germany, 2017, 9 pp.

Guo, et al., "Vision-based Lawn Boundary Recognition for Mowing Robot," Advances in Computer Science Research, vol. 52, 2016 International Conference on Computer Engineering and Information Systems, 5 pp.

Holder, et al., "From On-Road to Off: Transfer Learning within a Deep Convolutional Neural Network for Segmentation and Classification of Off-Road Scenes," Computer Vision ECCV 2016 workshops: Amsterdam, The Netherlands, 15 pp.

LeCun, et al., "Off-Road Obstacle Avoidance through End-to-End Learning," Advances in Neural Information Processing Systems, 2006, 8 pp.

Ulanoff, Review of iRobot Roomba 980 on mashable.com, Sep. 17, 2015, 19 pp.

* cited by examiner

VISION SYSTEM INTEGRATION

CROSS REFERENCE

This application claims the benefit of U.S. Provisional Patent Application No. 62/691,445, filed on Jun. 28, 2018. The contents of this prior application is incorporated herein by reference in its entirety.

FIELD OF THE INVENTION

This application relates to autonomous lawn vehicles, a category that includes lawn mowers, tractors, and landscaping machinery.

BACKGROUND AND SUMMARY

The lawn mower industry continues to seek ways to ease users' physical burdens. Thus, lawn mowers have undergone an automation evolution, starting with self-propulsion, with recent developments signaling a movement towards unmanned (or autonomous) technology. These developments aim to purge physical labor from lawn mowing, at least as much as possible.

Autonomous lawn mowers typically include collision systems positioned at the front (although these can also appear on the sides or rear), similar to the bumpers on most automobiles. The collision system on an autonomous lawn mower usually includes one or more collision sensors. When an autonomous lawn mower travels across a lawn, impact with an object will trigger the collision sensor to initiate a safety process, and then permit the lawn mower to continue mowing.

In addition to a collision assembly, the typical autonomous lawn mower includes a navigation system, although the term "navigation" is used broadly here. The term can encompass any system that helps the autonomous lawn mower navigate, traverse, or stay within the bounds of a user's lawn.

In one known system, underground wires or beacons can mark a lawn's borders, along with obstacles interior to a yard such as trees or flower beds. But these markers require time-consuming, burdensome installation and a separate power source. Indeed, these markers often generate a magnetic field so the autonomous lawn mower can sense, monitor, and stay within the bounds of the marked border. This field is vulnerable to interference from underground ferromagnetic materials and neighboring marker systems. In addition, the markers are vulnerable to physical damage from gardening activities or excavation and may require maintenance. As a result, underground markers can suffer downtime.

In another known system, an autonomous lawn mower can follow a GPS-mapped path. Reliance on GPS, however, risks signal distortions and reflections, given the landmarks, walls, and tree canopies, among other obstructions, in many lawns. Further, without the most power-hungry and expensive equipment, a GPS-guided autonomous lawn mower cannot approach optimal mowing precision. That is, these types of lawn mowers cannot mow within a few inches of obstacles (if those obstacles are somehow even programmed into the GPS map), and must instead keep a larger distance from those obstacles to provide enough assurance to avoid collisions, leaving significant portions unmowed.

In another known system, autonomous lawn mowers can rely on mowing paths stored in memory, based on a previous, memorized mowing path, to subsequently navigate that lawn. Reliance on a stored mowing path, however, also requires continual updates as the lawn environment changes, regardless of how small those changes might be.

Finally, other known autonomous lawn mowers simply navigate randomly about a lawn, relying on a bumper and collision sensor to hit (and then maneuver about) obstacles. In short, many autonomous lawn mowers lack any actual navigation system, like the three mentioned previously, or otherwise. These lawn mowers constantly recalibrate their paths from object to object. This risks damaging those objects, and the lawn mowers themselves.

Each approach presents unique problems and all of these approaches lack any reliable way to address temporary obstacles and periodic changes to a lawn. A system should account for unexpected, continual changes all lawns present, while minimizing the reliance on a collision sensor. This system should minimize installation costs and operational interruptions, whether those hindrances stem from electronic interference with underground markers or physical obstructions to GPS. Finally, the system should maximize precision by mowing as near as possible to obstacles and borders.

The systems disclosed describe an autonomous lawn mower that improves obstacle avoidance by combining a collision sensor with a vision-based obstacle avoidance system, where the vision system will in certain manners mimic the input that would be received from the collision sensor to provide a more accurate and responsive signal to the drive system and/or the cutting blade system to avoid collisions and/or stop the mower and if necessary stop the blades. For purposes of this disclosure, obstacles are objects or surfaces an autonomous lawn mower would not reasonably mow. For example, an autonomous lawn mower might be programmed not to mow large sticks, significant holes, animals, sidewalks, lawn décor, toys, and children.

The description, below, and its accompanying drawings, will provide a better understanding of the invention and set forth embodiments that indicate the various ways in which the invention may be employed.

DETAILED DESCRIPTION

This description describes one or more embodiments and should not limit the invention to those embodiments. The description explains principles of the invention to enable one of ordinary skill in the art to understand and apply the principles to practice both the described embodiments and other embodiments that may come to mind. The invention's scope should cover all embodiments that might fall within the scope of the claims, either literally or under the doctrine of equivalents.

Figure 1:
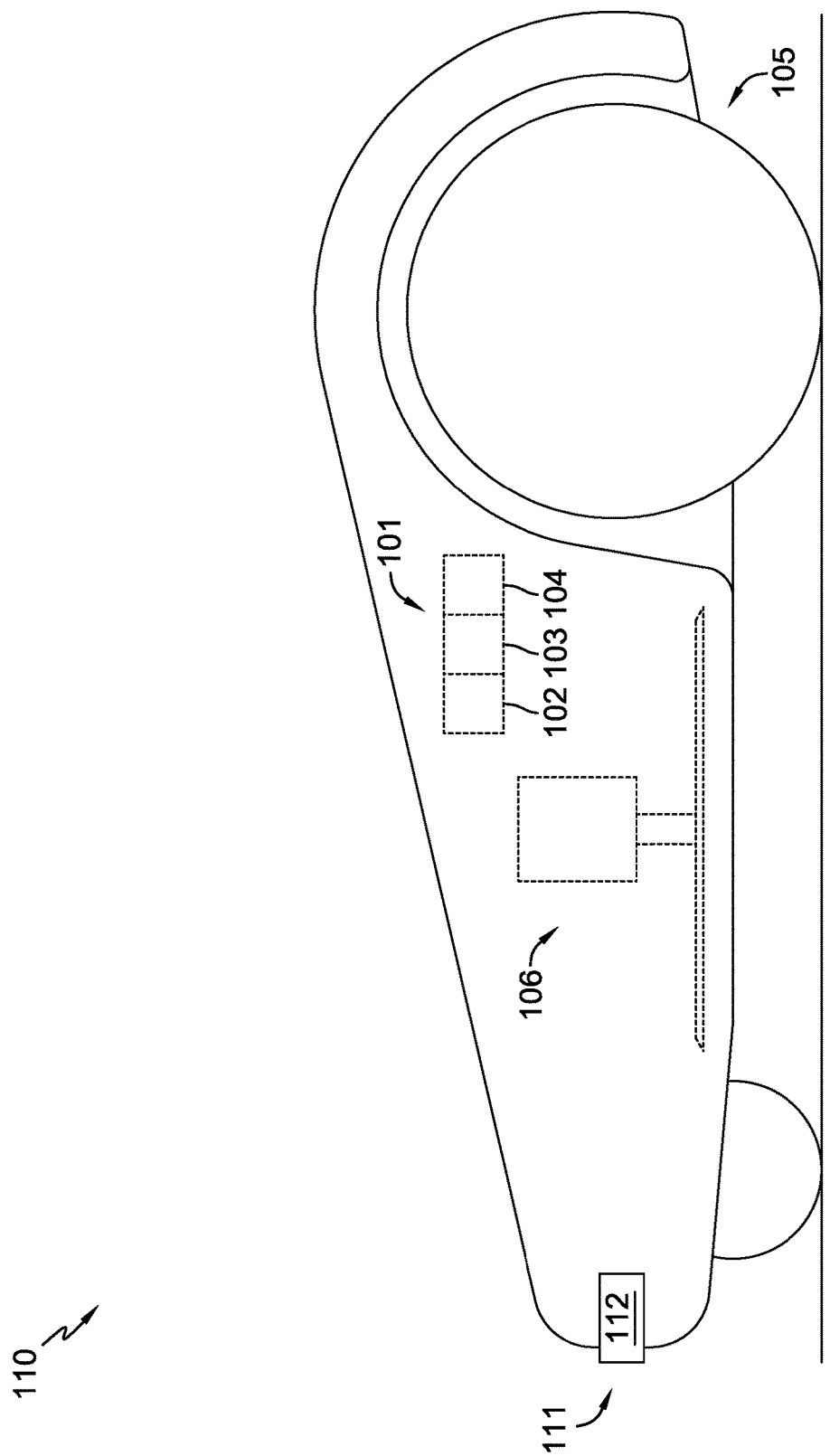
FIG. 1 is a side elevational view of an autonomous lawn mower embodiment featuring a collision assembly.

An exemplary embodiment combines a system similar to collision assembly 111, in FIG. 1, with a vision assembly. The collision sensor can be a displacement sensor (a Hall effect sensor, for example) that provides a signal to the main processor of an autonomous lawn mower upon collision. For a particular depiction, FIG. 1 shows a side view of autonomous lawn mower 110. Lawn mower 110 includes main board 101, drive system 105, blade system 106, and collision assembly 111. Collision assembly 111 includes collision sensor 112 and is in electronic communication with main board 101. For purposes of this disclosure, all connections, communications, and conjoining, among similar features, contemplate wired and wireless communication, direct and indirect connections, and multidirectional power and data transfer, unless otherwise stated.

Main board 101 includes main processor 102, drive controller 103, and blade controller 104, and connects to drive system 105 and blade system 106. Main processor 102 determines the commands drive controller 103 sends to drive system 105 and the commands blade controller 104 sends to blade system 106. Blade controller 104 and drive controller 103 may each comprise one or more electric motor controllers depending upon the number of motors used to drive the blade(s) in blade system 106 and the number of motors used in drive system 105.

Figure 2:
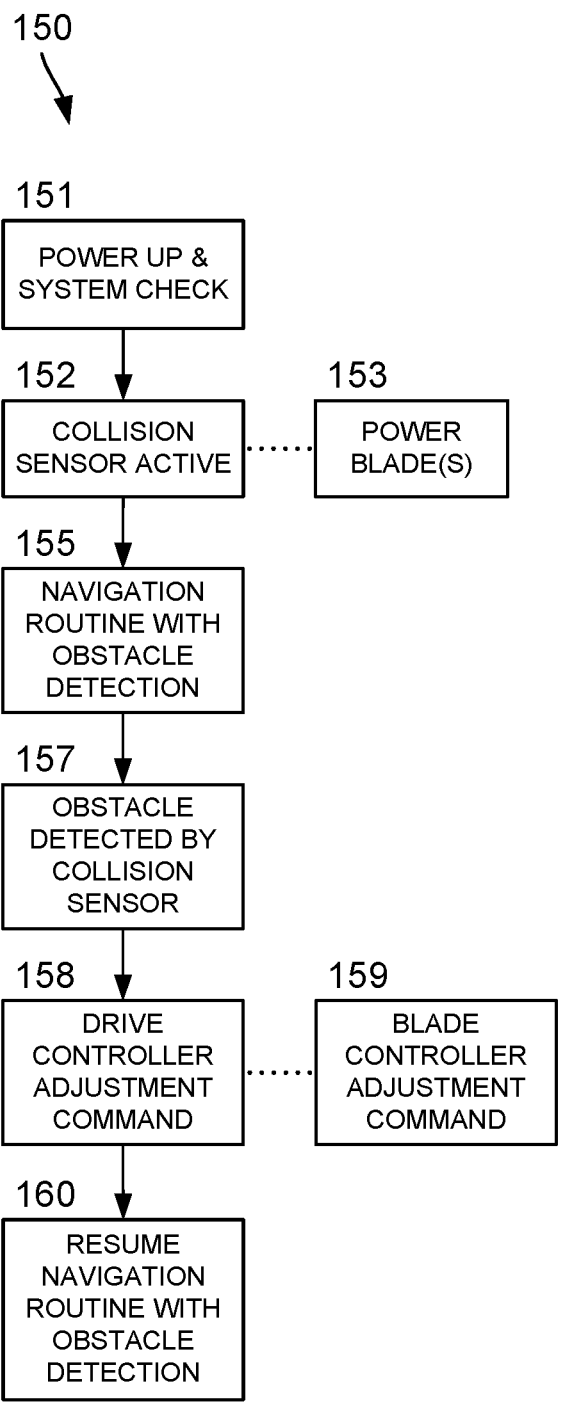
FIG. 2 is an exemplary process the autonomous lawn mower in FIG. 1 executes when impacting an obstacle.

FIG. 2 depicts process 150, which the lawn mower 110 executes when it impacts an object. At 151, lawn mower 110 powers up, before activating collision sensor 112 at 152 and powering the blade(s) at 153. As lawn mower 110 navigates a lawn, at 155, impact with an obstacle, at 157, will trigger collision sensor 112, which transmits a collision signal to the main board 101. Upon receiving the collision signal, main board 101 will issue an adjustment command via drive controller 103 to the drive system, at 158. This command can slow, stop, or turn lawn mower 101, for example.

Further, optional step 159 includes an adjustment command to blade system 106, which can brake or shut off the blade(s). In essence, each of steps 158 and 159 help lawn mower 110 avoid further impacts with the obstacle and decrease the risk of injury or property damage. After adjusting either drive system 105 or blade system 106, lawn mower 110 resumes its navigation, at 160, via a path that avoids a repeated collision with the obstacle.

Figure 3:
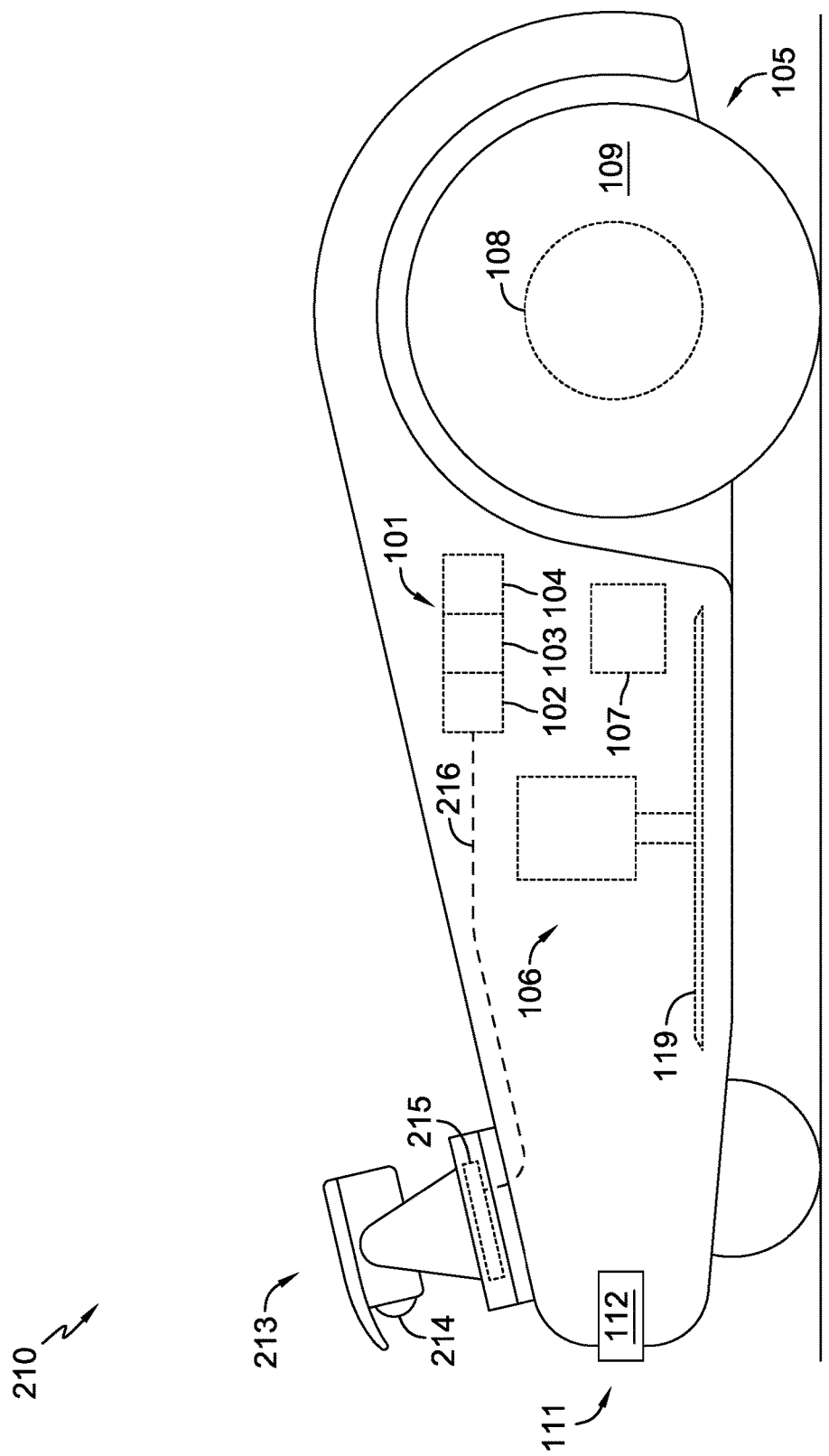
FIG. 3 is a side elevational view of an autonomous lawn mower embodiment featuring a collision assembly and a vision assembly.
Figure 4:
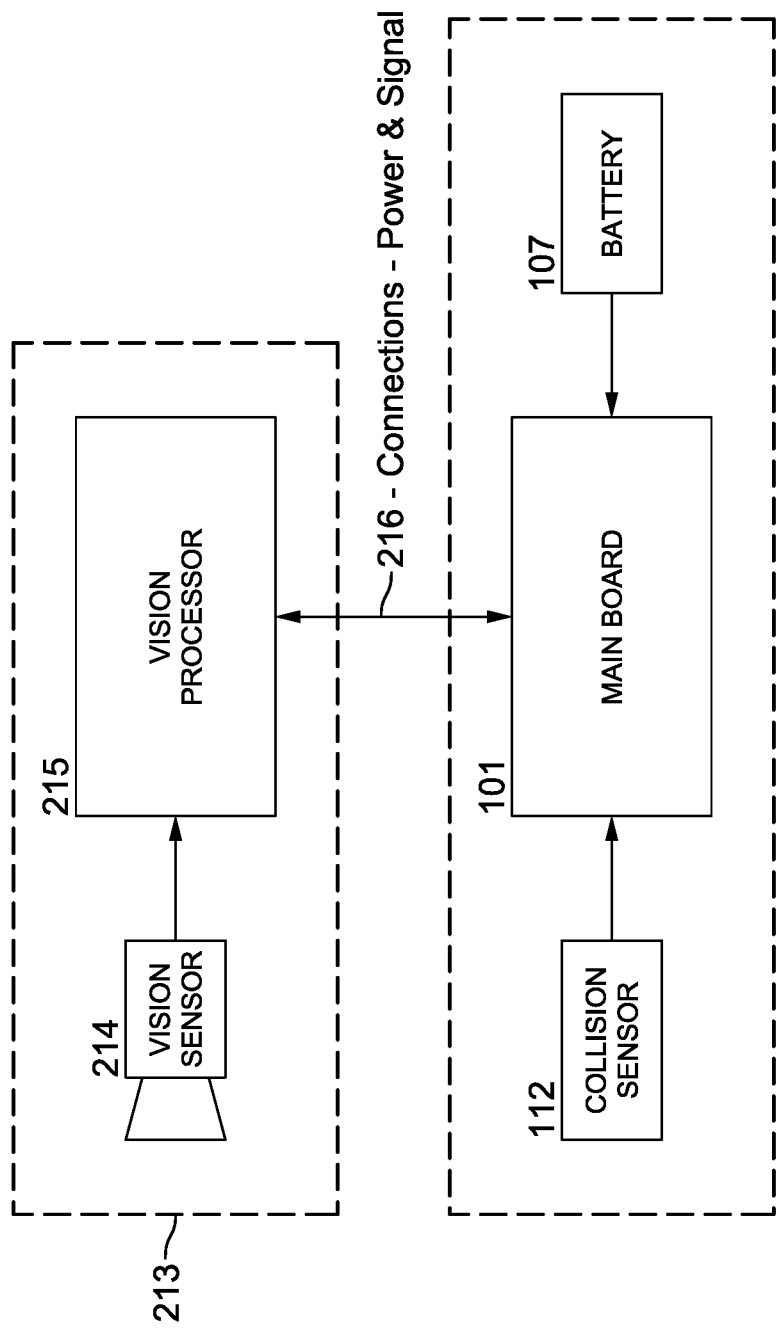
FIG. 4 is a diagram of the collision assembly and vision assembly of FIG. 3.
Figure 5:
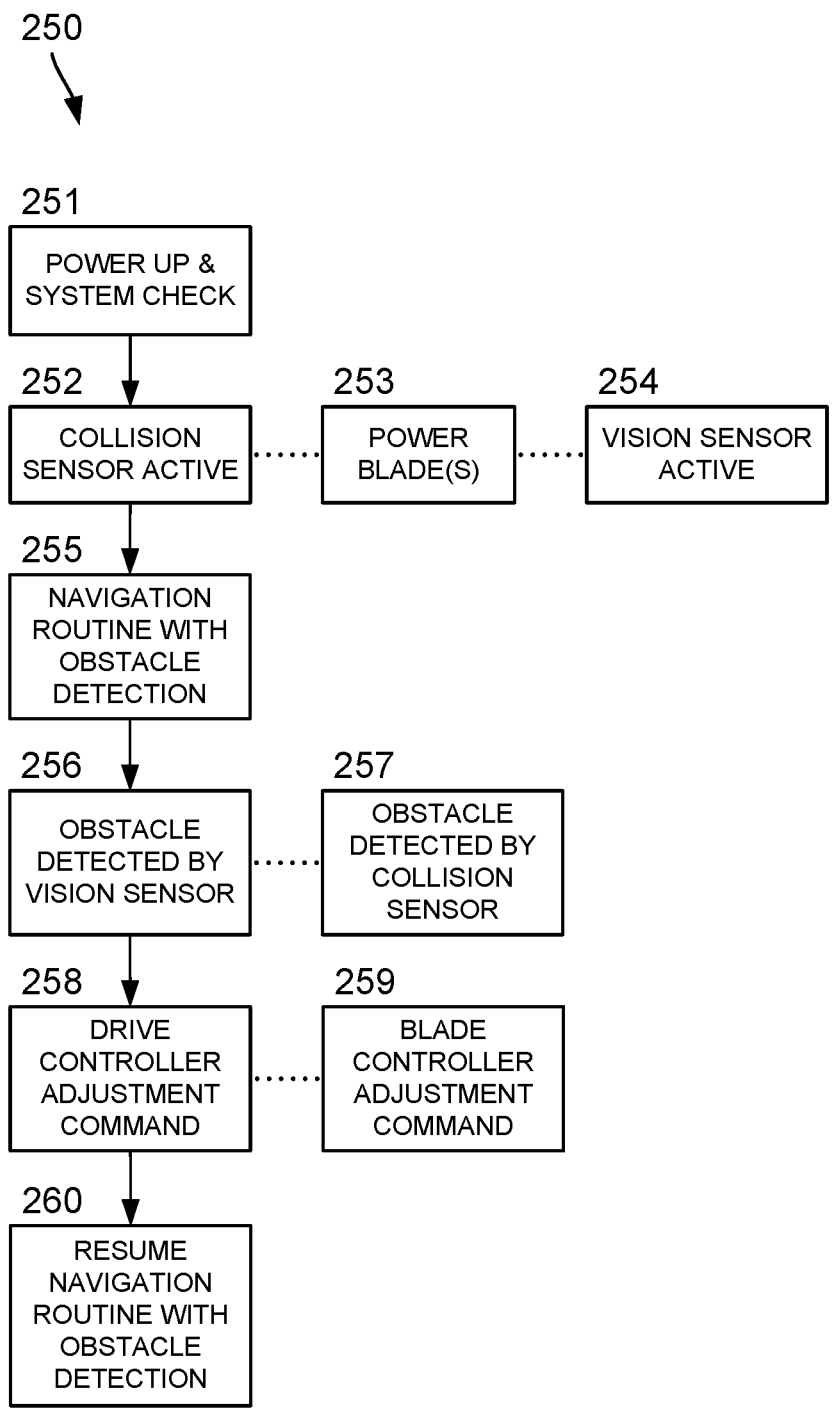
FIG. 5 is an exemplary process the autonomous lawn mower in FIG. 3 executes when encountering an obstacle.

FIGS. 3 and 4 show an exemplary combination of collision assembly 111 with vision assembly 213, and FIG. 5 represents an exemplary process for using the same. When an autonomous lawn mower equipped with vision assembly 213 and collision assembly 111 confronts an obstacle, vision assembly 213 replicates the communication that collision assembly 111 would otherwise implement (as discussed above) when the lawn mower collides with an obstacle. This communication reaches main board 101, which adjusts drive system 105 or blade system 106, or both.

Autonomous lawn mower 210 includes drive system 105 and blade system 106. In an exemplary embodiment, main board 101 includes a drive controller 103, which controls drive system 105 to determine the acceleration, braking, and turning of lawn mower 210. Drive controller 103 controls electric motors 108 to control rotation of two drive wheels 109, which can reside at either the front or rear of lawn mower 210. Drive controller 103 also helps steer lawn mower 210, in particular, by varying the rotational speed and direction of rotation of drive wheels 109. Although autonomous lawn mower 210 features a drive system having electric motors 108 powered by a battery 107, alternate drive systems powered by a gas engine or by a gas-electric hybrid system can substitute for the pure electric drive system of autonomous lawn mower 210.

Main board 101 also includes blade controller 104, which controls blade system 106 to determine the rotation of blade(s) 119. Blade controller 104 controls the blade(s) rotational speed, and can stop blade(s) 119 by sending an adjustment command to blade system 106, as described further below.

FIG. 3 shows vision assembly 213 as a modular accessory, with which a user can modify a compatible autonomous lawn mower. Despite this depiction, vision assembly 213 and collision assembly 111 can also be manufactured alongside one another and integral to autonomous lawn mower 210. FIG. 4 shows vision assembly 213 connected, via connection 216, to main board 101. Battery 107 powers main board 101, collision sensor 112, and vision assembly 213.

Collision assembly 111 includes collision sensor 112 and connects to main board 101, which connects to battery 107. Main board 101 houses main processor 102, while battery 107 connects to and powers main board 101, which regulates the power that reaches collision assembly 111.

Collision sensor 112 senses obstacles and can be any one of several impact sensors or switches, such as a displacement sensor (which simply relies on displacement to close an electronic circuit), a Hall Effect sensor, an inertia sensor, or a roller sensor. But collision sensor 112 may also, instead, be a current sensor, torque sensor, dynamometer, speed sensor, or accelerometer, for example, capable of detecting, either directly or indirectly, an interruption in lawn mower movement. Regardless, each of these sensors comports with the goal of collision sensor 112, which is, simply, to sense obstacles the autonomous lawn mower contacts. Thus, this disclosure refers to "collision sensors" as including not only impact sensors, but also any sensor that can sense impact with an obstacle based on changes to the lawn mower's speed, propulsion, and direction. The sensed impact on autonomous lawn mower 210 can occur at any external surface of the lawn mower body, e.g., the front, sides, rear, top, or bottom. A contact at any of these locations would affect the lawn mower's speed, propulsion, and direction.

Main board 101 includes main processor 102, which contains instructions that interpret and process input data from collision sensor 112. Main board 101 includes drive controller 103, which connects with drive system 105, and blade controller 104, which connects with blade system 106. Main processor 102, at its simplest, comprises any processor or chip capable of storing and executing instructions, but might alternatively comprise any number of an ARM chip, a DSP, or GPU, among other processors. As in lawn mower 110 in FIG. 1, main processor 102 of lawn mower 210 determines the commands drive controller 103 sends to drive system 105 and the commands blade controller 104 sends to blade system 106.

In action, for example, main board 101 and main processor 102 connect with, and constantly monitor, the voltage signal output from collision assembly 111. For example, main board 101 looks detects either a zero-signal (a 0V signal or simply, no voltage) or a threshold signal (a 5V signal). That is, when lawn mower 201 navigates a lawn, the main board 101 detects the zero-signal from collision assembly 111. When lawn mower 201 collides with an obstacle, collision sensor 112 (a Hall Effect sensor, for purposes of this example) displaces based on the bumper's contact with the obstacle, and collision assembly 111 produces the threshold signal instead of the zero-signal. Based on the detection of this shift from the zero-signal to the threshold signal, main processor 102 will then command drive controller 104 or blade controller 106 to initiate a change to the normal operation of lawn mower 201, such as an evasive maneuver like a turn or blade stoppage.

Vision assembly 213 connects to main board 101 and draws energy from battery 107. Vision assembly 213 may also include its own power source (not shown), separate from battery 107. Vision assembly 213 can be installed on autonomous lawn mower 210 either after manufacture, as a plug-in, optional, or modular component, or autonomous lawn mower 210 can be manufactured with both collision assembly 111 and vision assembly 213 built-in.

Vision assembly 213 uses vision sensor 214 and vision processor 215 to determine the presence of obstacles as autonomous lawn mower 210 approaches them, reducing the reliance on collision assembly 111, which lawn mower 210 would only use when vision assembly 213 fails to recognize an obstacle. Unlike other navigation systems, vision assembly 213 can address temporary or moving obstacles, such as fallen tree branches, the movement of pets or persons, and other changes to a mowing environment. Vision sensor 214 can be a 2D or 3D camera or a 360 degree camera, among other known technologies, and connects with vision processor 215. Vision assembly 213 can include one or more of these exemplary vision sensors, in any combination.

Vision processor 215 receives image data from vision sensor 214 and extracts relevant information from those data to apply internal, vision-based logic to identify obstacles, which are any objects or surfaces an autonomous lawn mower would not reasonably mow. For example, an autonomous lawn mower might be programmed not to mow large sticks, significant holes, animals, sidewalks, lawn décor, toys, and children. Vision processor 215 can reside either on main board 101 or connect to main board 101 through connection 216, while residing elsewhere on autonomous lawn mower 210. Regardless of its location, vision processor 215 connects with main board 101 and main processor 102. Vision processor 215, like main processor 102, comprises any chip capable of storing and executing instructions, and might combine any number of an ARM chip, a DSP, or GPU, among other processors. Vision sensor 214 may also connect to, and rely solely on, main processor 102, obviating the need for a vision processor entirely, with main processor 102 performing the functions that vision processor 215 would otherwise perform. This arrangement presumes main processor 102 features the relevant, internal, vision-based logic.

Vision sensor 214 captures image(s) and/or video of an area in front of autonomous lawn mower 210. For example, vision sensor 214 includes a 2D camera, a 3D camera, a 360-degree camera, and/or any other type of camera that is configured to capture image(s) and/or video of a surrounding area of autonomous lawn mower 210. Vision processor 215 uses image recognition software to detect obstacles and/or other lawn objects that autonomous lawn mower 210 is approaching.

For example, to detect the obstacles and/or other lawn objects, vision processor 215 uses image recognition software to perform segmentation of the image(s) captured by vision sensor 214. Image segmentation is an image classification technique that assigns pixels of an image to different constituent parts based on characteristics of those constituent parts. Further, as an alternative, vision processor 215 may identify portions of a captured image that are associated with uncut grass, cut grass, particular types of obstacles, and other classes of lawn objects. In fact, various vision assemblies can complement collision assembly 111 in lawn mower 210.

To perform image segmentation, vision processor 215 uses edge detection and/or machine learning techniques such as artificial neural networks (e.g., convolutional neural networks). For example, a convolutional neural network of vision processor 215 includes color-based, texture-based, structural-based, and/or other characteristic-based processing to perform image recognition. Additionally or alternatively, vision processor 215 uses may use Lidar as a supplement to vision sensor 214, to continuously determine a distance between autonomous lawn mower 210 and an obstacle. For example, autonomous lawn mower 210 includes a Lidar sensor to facilitate vison processor 215 in detecting obstacles and identifying corresponding movement paths of autonomous lawn mower 210 in low-light environments. In other embodiments, radar or an ultrasonic sensor may be used to supplement vision sensor 214 for similar reasons.

By combining vision assembly 213 with collision assembly 111, autonomous lawn mower 210 will avoid obstacles using vision assembly 213, rendering collision assembly 111, in essence, a backup feature. Although collision assembly 111 remains operational, and collision with an obstacle will prompt main board 101 to initiate a safety procedure, the collision assembly process becomes secondary to the vision assembly process.

In a system without vision assembly 213, like the one described above, collision assembly 111 serves as the sole mechanism for autonomous lawn mower 210 to address obstacles. During operation, drive system 105 propels autonomous lawn mower 210 forward while blade system 106 rotates blade(s) 119. When autonomous lawn mower 210 impacts an obstacle, collision sensor 112 senses the collision and transmits a collision signal to main board 101. Main processor 102 processes that signal so drive controller 103 can send an adjustment command to drive system 105, blade controller 104 can send an adjustment command to blade system 106, or the controllers can send adjustment commands to both systems.

Drive controller 103 can command drive system 105 to initiate any of the following courses of action for lawn mower 210, among others: (a) immediate stoppage, followed by a left or right turn away from the obstacle; (b) reversal, followed by a left or right turn away from the obstacle; (c) delayed (0.5 to 1 second delay) stoppage, followed by a left or right turn away from the obstacle; and (d) substantially complete or complete 180° turnaround. Each of these actions recalibrates the mowing path and avoids damaging the obstacle or the lawn mower after the initial impact. Also, upon impact, blade controller 104 can command blade system 106 to pause blade rotation for an appropriate time period until autonomous lawn mower 210 has successfully avoided further impacts with the obstacle.

In an exemplary embodiment combining collision assembly 111 with vision assembly 213, collision assembly 111 becomes secondary. During operation, vision sensor 214 will constantly transmit image data to main processor 102 or vision processor 215 (depending on whether vision assembly 213 includes its own processor, as described further below) as autonomous lawn mower 210 navigates a lawn. The processor continually determines whether autonomous lawn mower 210 is approaching an obstacle by processing image data from a programmed distance in front of the lawn mower. This distance may be between zero (0) and six (6) inches, based on the angle and height of vision sensor 214, and the programmed field of view of vision sensor 214, which is approximately the width of the front of lawn mower 210. Depending on the desired precision and safety margins, a user can adjust both the angle and height of vision sensor 214 to vary the programmed distance.

In a first hardware arrangement, vision sensor 214 can connect to main board 101 and rely solely on main processor 102, without an additional vision-specific processor (a "one-processor arrangement"). Vision sensor 214 transmits image data to main processor 102, which determines whether the image data reveal that autonomous lawn mower 210 is approaching an obstacle. If main processor 102 determines the data represent an obstacle, main processor 102 will command drive controller 103 to send an adjustment command to drive system 105 or blade controller 104 to send an adjustment command to blade system 106, or command both controllers to send a combination of adjustment commands. This two-processor arrangement means that the control responses of lawn mower 210 programmed into the processor and controllers of main board 101 need not be replicated in a separate vehicle control system responsive to commands from vision processor 215. Consequently, vision assembly 213 takes on a self-contained, plug-and-play or modular character, while main processor 102 need not have the capability and capacity to process image data. This reduces component complexity and cost.

In a second hardware arrangement, vision assembly 213 can include its own processor, instead of relying solely on main processor 102 (a "two-processor arrangement"). Vision sensor 214 will intake the image data and transmit that data to vision processor 215. When vision processor 215 determines that certain image data reveal an obstacle, vision processor 215 transmits a collision-replicating signal to main board 101. The collision-replicating signal mimics the collision signal collision sensor 112 sends main board 101 when lawn mower 210 collides with an obstacle, making main processor "think" autonomous lawn mower 210 has collided with an obstacle by matching the voltage of the collision-based signal to create the same effect a collision would. From this point, as in the one-processor arrangement, main processor 102 (which does not distinguish the collision signal from the collision-replicating signal) will command drive controller 103 to send an adjustment command to drive system 105 or blade controller 104 to send an adjustment command to blade system 106, or command both controllers to send adjustment commands.

Regardless whether vision assembly 213 includes the one-processor arrangement or the two-processor arrangement, controllers on the main board transmit adjustment commands to drive system 105 or blade system 106, or both systems. Further, in either arrangement, the output of vision assembly 213 mimics that of collision assembly 111 when a collision occurs: main board 101 will receive the zero-signal under normal operation and it will receive the threshold signal when vision assembly 213 detects an obstacle. The logic of vision assembly 213, upon sensing an obstacle, will trigger the emission of the threshold voltage. Drive system 105 can then decelerate, stop, turn, or employ any combination of maneuvers, while blade system 106 can adjust the blade rotation, including stopping the blade rotation.

An exemplary process 250 for using such a system is shown in FIG. 5. At 251, the lawn mower powers up, then activates the collision sensor at 252, powers the blade(s) at 253, and activates the vision sensor at 254. As the lawn mower navigates a lawn, at 255, the vision sensor's detection of an obstacle, at 256, or the collision sensor's collision with an obstacle, at 257, will result in the transmission of a collision or collision-replicating signal to main board 101. Upon receiving this signal, main processor 102 will command drive controller 103 to adjust drive system 105, at 258, command blade controller 104 to adjust the blade system 106, at 259, or controllers 103, 104 will adjust both systems 105, 106. After adjusting one or both of the systems, lawn mower 210 resumes its navigation, at 260, via a path that avoids a repeated collision with the obstacle.

Using vision assembly 213, blade controller 104 can relay different adjustment commands to blade system 106 based on the type of obstacle that lawn mower 210 confronts. For example, either main processor 102 or vision processor 215 can distinguish between different types of obstacles and initiate different adjustment commands accordingly: (a) when vision sensor 214 senses an obstacle that represents a human or a pet, blade system 106 can stop blades entirely; (b) when vision sensor 214 senses an inanimate obstacle that lawn mower 210 should avoid damaging (say, a garden hose), blade system 106 can pause blade rotation for a time period of anywhere between 1 and 3 seconds, permitting lawn mower 210 to resume navigation along a different path; and (c) when vision sensor 214 senses an inanimate obstacle that lawn mower 210 need not avoid mowing (a small twig, perhaps), blade system 106 can maintain blade rotational speed. Either main processor 102 or vision processor 215 can feature different visual processing abilities that can correspond to different blade rotation adjustments, depending on relevant safety requirements and the manufacturer's or user's preferences.

While the foregoing description expounds upon specific embodiments of the invention, those skilled in the art will appreciate that one could modify or adapt those embodiments based on the teachings herein. Accordingly, the disclosed arrangements are merely illustrative and should not limit the invention's scope.

The invention claimed is:

1. A control system for a lawn vehicle having a drive system to control movement of the lawn vehicle and a blade system to control rotation of at least one blade, the control system comprising:
    a collision assembly including a collision sensor;
    a main processor in communication with the collision sensor, the drive system, and the blade system;
    wherein, the collision sensor, upon sensing a collision between the lawn vehicle and an obstacle, is configured to transmit a collision signal to the main processor;
    upon receipt of the collision signal by the main processor, a first adjustment command is transmitted to at least one of (a) the drive system to adjust the movement of the lawn vehicle and (b) the blade system to adjust the rotation of the at least one blade;
    a vision assembly, including a vision sensor, comprising:
    the vision sensor in communication with the main processor and configured to transmit image data to the main processor;
    the main processor configured to determine whether the received image data represent an obstacle, wherein when the main processor determines the received image data represent an obstacle, a second adjustment command is transmitted to at least one of (a) the drive system to adjust the movement of the lawn vehicle and the (b) the blade system to adjust the rotation of the at least one blade, the first adjustment command and the second adjustment command having the same voltage as one another.

2. The control system of claim 1, where the collision assembly further includes a bumper configured to be displaced when the lawn vehicle collides with an obstacle to trigger the collision sensor to transmit the collision signal to the main processor.

3. The control system of claim 1, where the collision sensor is one of a Hall Effect sensor, current sensor, torque sensor, dynamometer, accelerometer, and speed sensor.

4. The control system of claim 1, where the collision sensor is located at a bottom portion of the lawn vehicle.

5. The control system of claim 1, where the collision sensor is located at a side portion of the lawn vehicle.

6. The control system of claim 1, where the vision sensor comprises a camera.

7. The control system of claim 1, further comprising a supplementary sensor, wherein the supplementary sensor comprises one of a radar, Lidar, and ultrasonic system.

8. The control system of claim 1, where the drive system reverses the lawn vehicle upon receipt by the drive system of at least one of the first adjustment command or the second adjustment command.

9. The control system of claim 1, where the drive system stops the lawn vehicle upon receipt by the drive system of at least one of the first adjustment command or the second adjustment command.

10. The control system of claim 1, where the drive system turns the lawn vehicle upon receipt by the drive system of at least one of the first adjustment command or the second adjustment command.

11. The control system of claim 1, where the blade system stops movement of the at least one blade upon receipt by the blade system of at least one of the first adjustment command or the second adjustment command.

12. The control system of claim 1, where the lawn vehicle moves according to a first navigation before the at least one (a) adjustment of the movement of the lawn vehicle and (b) adjustment of the rotation of the at least one blade, and where the lawn vehicle resumes movement according to a second navigation after the at least one (a) adjustment of the movement of the lawn vehicle and (b) adjustment of the rotation of the at least one blade.

13. A control system for a lawn vehicle having a drive system to control movement of the lawn vehicle and a blade system to control rotation of at least one blade, the control system comprising:
   a collision assembly comprising a collision sensor;
   a main processor in communication with the collision sensor, the drive system, and the blade system;
   a main board associated with the main processor;
   wherein, the collision sensor transmits a collision signal to the main processor upon detection of a collision between the lawn vehicle and an obstacle;
   upon receipt of the collision signal by the main processor, an adjustment command is transmitted to at least one of (a) the drive system to adjust the movement of the lawn vehicle and (b) the blade system to adjust the rotation of the at least one blade;
   a vision assembly comprising:
   a vision sensor configured to transmit image data;
   a vision processor in communication with the vision sensor and the main processor, and configured to receive the image data from the vision sensor and determining whether the received image data represent an obstacle;
   wherein, when the vision processor determines that the received image data represent an obstacle, the vision processor transmits a collision-replicating signal to the main processor;
   upon receipt of the collision-replicating signal by the main processor, the adjustment command is transmitted to at least one of (a) the drive system to adjust the movement of the lawn vehicle and (b) the blade system to adjust the rotation of the at least one blade; and
   wherein the blade system stops movement of the at least one blade upon the blade system's receipt of the adjustment command from the main processor.

14. The control system of claim 13, where the collision assembly further includes a bumper configured to be displaced when the lawn vehicle collides with an obstacle to trigger the collision sensor to transmit the collision signal to the main processor.

15. The control system of claim 13, where the collision sensor is one of a Hall Effect sensor, torque sensor, dynamometer, accelerometer, and speed sensor.

16. The control system of claim 13, where the collision sensor is located at a bottom portion of the lawn vehicle.

17. The control system of claim 13, where the collision sensor is located at a side portion of the lawn vehicle.

18. The control system of claim 13, where the vision sensor comprises a camera.

19. The control system of claim 13, further comprising a supplementary sensor, wherein the supplementary sensor comprises one of a radar, Lidar, and ultrasonic system.

20. The control system of claim 13, where the drive system reverses movement of the lawn vehicle upon the drive system's receipt of the adjustment command from the main processor.

21. The control system of claim 13, where the drive system stops movement of the lawn vehicle upon the drive system's receipt of the adjustment command from the main processor.

22. The control system of claim 13, where the drive system turns the lawn vehicle upon the drive system's receipt of the adjustment command from the main processor.

23. The control system of claim 13, where the lawn vehicle moves according to a first navigation before the at least one (a) adjustment of the movement of the lawn vehicle and (b) adjustment of the rotation of the at least one blade, and where the lawn vehicle resumes movement according to a second navigation after the (a) at least one adjustment of the movement of the lawn vehicle and (b) adjustment of the rotation of the at least one blade.

24. A control system for a lawn vehicle comprising:
   a drive system to control movement of the lawn vehicle;
   a blade system to control rotation of at least one blade;
   a collision assembly including a collision sensor;
   a main board in communication with the collision sensor, the drive system, and the blade system;
   a vision assembly in communication with the main board and having a vision sensor;
   wherein the collision sensor, upon sensing a collision between the lawn vehicle and an obstacle, is configured to transmit a collision signal to the main board;
   wherein the main board, upon receipt of the collision signal, is configured to transmit a drive adjustment command to the drive system to adjust the movement of the lawn vehicle and/or transmit a blade adjustment command to the blade system to adjust the rotation of the at least one blade;
   wherein the vision sensor is configured to transmit image data to the main board for processing to determine whether the image data represent an obstacle;
   wherein the main board, upon a determination that the image data represent an obstacle, is configured to transmit the drive adjustment command to the drive system to adjust the movement of the lawn vehicle and/or transmit the blade adjustment command to the blade system to adjust the rotation of the at least one blade; and wherein the blade adjustment command maintains blade rotational speed of the at least one blade when an obstacle is categorized as an inanimate obstacle that the lawn vehicle need not avoid mowing.

25. The control system of claim 24, wherein the main board comprises a main processor, a drive controller, and a blade controller.

26. The control system of claim 25, wherein the main processor is configured to receive the collision signal and cause the drive controller to transmit the drive adjustment command to adjust the movement of the lawn vehicle and/or cause the blade controller to transmit the blade adjustment command to adjust the rotation of the at least one blade.

27. The control system of claim 25, wherein the main processor is configured to receive and process the image data and determine whether the image data represent an obstacle, and upon a determination that the image data represent an obstacle, cause the drive controller to transmit the drive adjustment command to adjust the movement of the lawn vehicle and/or cause the blade controller transmit the blade adjustment command to adjust the rotation of the at least one blade.

28. The control system of claim 25, wherein the vision assembly communicates with the main board through a vision processor in communication with the main processor and the vision sensor.

29. The control system of claim 28, wherein the vision processor is configured to receive and process the image data and determine whether the image data represent an obstacle, and upon a determination that the image data represent an obstacle, transmit a collision-replicating signal to the main processor.

30. The control system of claim 29, wherein the main processor is configured to receive the collision-replicating signal and cause the drive controller to transmit the drive adjustment command to adjust the movement of the lawn vehicle and/or cause the blade controller to transmit the blade adjustment command to adjust the rotation of the at least one blade.

31. The control system of claim 24, wherein the blade adjustment command stops rotation of the at least one blade when the obstacle is categorized as a human or pet.

32. The control system of claim 24, wherein the blade adjustment command pauses rotation of the at least one blade for a period of time between one and three seconds when an obstacle is categorized as an inanimate obstacle that the lawn vehicle should avoid damaging.

* * * * *